(12) United States Patent
Aebischer et al.

(10) Patent No.: US 7,671,971 B2
(45) Date of Patent: Mar. 2, 2010

(54) ELECTRO-OPTICAL METHOD FOR MEASURING DISTANCE AND DETECTING A NON-IDEAL CHIRP PROFILE

(75) Inventors: Beat Aebischer, Heerbrugg (CH); Marcel Rohner, Heiden (CH)

(73) Assignee: Leica Geosystems AG, Heerbrugg (CH)

( * ) Notice: Subject to any disclaimer, the term of this patent is extended or adjusted under 35 U.S.C. 154(b) by 342 days.

(21) Appl. No.: 11/576,794

(22) PCT Filed: Sep. 29, 2005

(86) PCT No.: PCT/EP2005/054900
§ 371 (c)(1),
(2), (4) Date: May 17, 2007

(87) PCT Pub. No.: WO2006/040263
PCT Pub. Date: Apr. 20, 2006

(65) Prior Publication Data
US 2009/0135403 A1    May 28, 2009

(30) Foreign Application Priority Data
Oct. 9, 2004    (EP)    ................................. 04024127

(51) Int. Cl.
*G01C 3/08*    (2006.01)
(52) U.S. Cl. ...................................... 356/5.09
(58) Field of Classification Search ....... 356/3.01–3.15, 356/4.01–4.1, 5.01–5.15, 6–22, 128, 128.5, 356/139.09, 139.1
See application file for complete search history.

(56) References Cited

U.S. PATENT DOCUMENTS

| | | | | |
|---|---|---|---|---|
| 6,040,898 | A * | 3/2000 | Mrosik et al. | 356/5.09 |
| 7,068,216 | B2 * | 6/2006 | Kliewer et al. | 342/174 |
| 2005/0078295 | A1 * | 4/2005 | Tansey | 356/4.1 |

FOREIGN PATENT DOCUMENTS

| | | |
|---|---|---|
| EP | 0 501 566 | 9/1992 |
| EP | 1 316 815 | 6/2003 |

(Continued)

OTHER PUBLICATIONS

Kulpa K S et al: "The simple method for analysis of nonlinear frequency distortions in FMCW radar," Microwaves, Radar and Wireless Communications. 2000. Mikon-2000. 13th International Conference on May 22-24, 2000, Piscataway, NJ, USA, IEEE, vol. 1, May 22, 2000, pp. 235-238, XP010537348.

(Continued)

*Primary Examiner*—Thomas H Tarcza
*Assistant Examiner*—Luke D Ratcliffe
(74) *Attorney, Agent, or Firm*—Workman Nydegger (57) ABSTRACT

The invention relates to an electro-optical distance measuring method wherein frequency-modulated optical radiation is emitted onto at least one target to be measured. Once the radiation back-scattered to the target is received, the chirp of radiation is modeled by means of a phase function $\Phi(t)$ having parameters $c_j$, thereby making description of the deviation of the chirp from the linear profile possible. The parameters used for description are at least partially determined from measurements or are coestimated during numerical signal processing.

30 Claims, 6 Drawing Sheets

FOREIGN PATENT DOCUMENTS

EP        1 464 982        10/2004

OTHER PUBLICATIONS

Karlsson C J et al: "Linearization of the frequency sweep of a frequency-modulated continuous-wave semiconductor laser radar and the resulting ranging performance," Applied Optics Opt. Soc. America USA, vol. 38, No. 15, May 20, 1999, pp. 3376-3386, XP002319569.

Peleg S et al: "Signal estimation using the discrete polynominal transform," Statistical Signal and Array Processing. Minneapolis, Apr. 27-30, 1993, Proceedings of the International Conference on Acoustics, Speech, and Signal Processing (ICASSP), New York, IEEE, US, vol. 4, Apr. 27, 1993, pp. 424-427, XP010110820.

Peleg S et al: "Linear FM signal parameter estimation from discrete-time observations," IEEE Transactions on Aerospace and Electronic Systems USA, vol. 27, No. 4, Jul. 4, 1991, pp. 607-616, XP002319570.

Djuric P M et al: "Parameter estimation of chirp signals," IEEE Transactions on Acoustics, Speech and Signal Processing USA, vol. 38, No. 12, Dec. 12, 1990, pp. 2118-2126, XP002319571.

* cited by examiner

ELECTRO-OPTICAL METHOD FOR MEASURING DISTANCE AND DETECTING A NON-IDEAL CHIRP PROFILE

The invention relates to an electro-optical distance-measuring method according to the pre-characterizing clause of claim 1, an electro-optical distance-measuring apparatus according to the pre-characterizing clause of claim 12 and a computer program product.

In the area of electronic or electro-optical distance measurement, various principles and methods are known. The approach consists in transmitting frequency-modulated electromagnetic radiation, such as, for example, visible or non-visible laser light, to the target to be surveyed and subsequently receiving one or more echoes from back-reflecting objects, ideally exclusively from the target to be surveyed. After reception, the optionally superposed echo signal is superposed with a mixing signal and the frequency of the signal to be analysed is thus reduced so that the apparatus need not be very complex. The mixing can be effected either as a homodyne method with the transmitted signal or as a heterodyne method with a periodic, in particular harmonic signal of known period. Thus, the methods differ in that mixing is effected with the transmitted signal itself or with a harmonic signal having its own frequency. The mixing serves for transforming the received signal to a lower frequency. Subsequently, the transit times and hence—in the case of known propagation velocity of the radiation used—the distances to the targets to be surveyed are determined from the resulting signal.

The apparatuses used for implementing these methods usually use a signal generator as a chirp generator, which superposes a signal on a radiation source which can be modulated. In the optical area, lasers are generally used as radiation sources. In the optical area, transmission and reception optical systems are used for emission and reception, respectively a detector and receiver with subsequent mixer, A/D converter and digital signal processor being connected down-circuit of said optical systems.

Usually, a linear frequency-modulated chirp is generated by the signal generator as signal s(t):

$$s(t)=a+b\cdot\cos(2\pi\cdot\Phi(t)), \Phi(t)=c+d\cdot t+e\cdot t^2 \quad (1)$$

the instantaneous frequency $$f(t) = \frac{d\Phi(t)}{dt}$$

then being a linear function of time:

$$f(t)=d+2e\cdot t \quad (2)$$

which simplifies the determination of transit times.

In the case of n targets having relative amplitudes $A_k$ and transit times $t_k$ (k=1, ..., n), the noise-free echo signal e(t) can be written as follows:

$$e(t) = \sum_{k=1}^{n} A_k s(t - t_k) \quad (3)$$

This echo signal e(t) is detected and is mixed with the signal m(t):

$$m(t) = \begin{cases} s(t - t_0), & \text{homodyne} \\ \cos(2\pi(f_0 t + \varphi)), & \text{heterodyne} \end{cases} \quad (4)$$

The mixing with m(t) results in the signal $$d(t) = \int_0^\infty h(t - t') \cdot e(t') \cdot m(t') dt' \quad (5)$$

where h designates the pulse response of a suitable low-pass filter.

For an ideal low pass, the low-pass filtration in (5) can be carried out explicitly to a very good approximation according to the prior art; in the homodyne case, for example, the first equation in (1) and the equations (3) to (5), after omission of the high frequency terms, lead to $$d(t) = d_0 + \frac{b^2}{2} \sum_{k=1}^{n} A_k \cos(2\pi[\Phi(t - t_k) - \Phi(t - t_0)]) \quad (5')$$

with the signal offset $$d_0 = a^2 \sum_{k=1}^{n} A_k.$$

The mixed signal d(t) is digitized from the finite measuring interval $-T/2 \leq t \leq T/2$ and stored. The transit times $t_k$ are determined from the frequency information and optionally the phase information of this signal, it usually being possible to assume that n is small and may also be known. One of the echoes, e.g. the n th one, can also originate from a fixed and known reference target, and the target distances of the remaining targets are calculated from the transit time distances $t_k - t_n$ and the known distance of the reference target. In the homodyne case, the mixing signal $m(t)=s(t-t_0)$ itself can serve as a reference, and $t_0$ then corresponds to the reference distance.

In the case of a linear chirp according to equation (1), the k th echo contributes the instantaneous frequency $$f_k(t) = \begin{cases} 2e(t_0 - t_k), & \text{homodyne} \\ d + 2e(t - t_k) - f_0, & \text{heterodyne} \end{cases} \quad (6)$$

to the signal d(t). In this case, the transit times $t_k$ can in principle therefore be determined directly from a frequency analysis—a time-result frequency analysis in the heterodyne case—of the signal d(t), but the resolution is still coarse. More exact results can be obtained by taking into account the phase information.

Such or similar methods are described in the prior art, for example in the following publications.

EP 0 834 086 B1 describes an optical, FMCW distance-measuring method which has an accuracy in the range of phase measuring methods in a short measuring time. In said methods, a chirp generator generates, for example, a linearly frequency-modulated signal which is divided into a transmitted signal and reference signal, the two signals being subjected to complex multiplication with one another in a quadrature receiver.

DE 196 10 970 A1 discloses a frequency-modulated method with continuous emission (FMCW method) for distance measurement using electromagnetic radiation in the radar range. A time-linear frequency-modulated (wobbled) signal is emitted and, after reflection via a target and subsequent reception, is analyzed. An intermediate frequency signal is generated from transmitted and received signal in a mixer and is subjected to a fast Fourier transformation.

In both publications—as well as in other solutions of the prior art—a known time-linear profile of the modulation frequency f(t) which is independent of the ageing of the device is assumed for the evaluation. Both the condition of being known and that of independence of ageing and the condition of linearity can be realised with the required accuracy only with great effort, if at all, in terms of apparatus.

Thus, for example, the laid-open application DE 100 65 657 A1 describes cascaded phase control loops for linearizing oscillators with strong phase noise. The aim is to produce linear analogue frequency ramps. Nevertheless, achievable linearity and a knowledge of the frequency profile remain subject to limitations which cannot be entirely avoided even with great effort in terms of apparatus.

Producing a chirp with predetermined frequency profile (e.g. linear) is therefore technically complicated and also not possible arbitrarily in an exact and stable manner. The resultant deviations of the transmitted signal from ideal behaviour cause systematic measuring errors.

EP 1 464 982 describes a method for FMCW radar devices having a non-linear transmitted frequency profile with ramp modulation. Linearization of the phase function—the quadratic phase function in the ideal case of the linear chirp—is effected thereby. For the parameters stated in this document, this approximation in the case of a target distance of 1100 m is about 10 ppm, so that this approach from the radar range is not suitable for the high-precision measurements of the electro-optical methods. In addition, the method uses a polynomial formulation in which the linear part in the modelling of the transmission ramp is assumed to be known. Furthermore, phase values are necessary for the evaluation, so that phase unwrapping is required. This formulation is therefore based on simplified modelling which gives rise to errors and the a priori knowledge of parameters or the required resolution of the phase values for deriving the parameters of the model.

An object of the invention is to provide a solution which permits improved identification and knowledge of the frequency profile and/or reduction or avoidance of the errors or of the effects thereof, it being intended to use the (real) received signal directly for the evaluation.

A further object of the present invention is to reduce the requirements with regard to the components used with constant performance or to increase the performance with the same components.

These objects are achieved or the solutions further developed by the subjects of claims 1 and 12, respectively, or of the dependent claims.

The basis of the invention is the modelling of the phase function $\phi(t)$ by a finite number of parameters, including non-linear ones. This can be effected by a general representation with arbitrary parameters $c_1, \ldots, c_m$ according to $$\Phi(t) = \Phi(t; c_1, \ldots, c_m) \tag{7}$$

or, for example, by a linear combination of suitable base functions $\phi_j(t)$, in particular powers or orthogonal polynomials, wavelets, discrete delta functions at the sampling times, with the coefficients $c_1, \ldots, c_m$ parameters:

$$\Phi(t) = \sum_{j=1}^{m} c_j \Phi_j(t) \tag{7'}$$

The additional parameters $c_j$ or at least some of the parameters $c_j$ are determined by measurements, for example are concomitantly determined in every measurement, it also being possible to effect this determination together with all other relevant system parameters and the transit times $t_k$. The determination of all unknown parameters thus becomes a (statistical) parameter estimation problem. An example of a specific determination method is the known maximum likelihood method, cf. for example §35 in B. L. van der Waerden: *Mathematische Statistik* [Mathematical Statistics], Springer-Verlag, Berlin, Göttingen, Heidelberg, 1957. There, the unknown parameters in the model signal d(t) according to equation (5') (or more generally according to the equations (1), (7), (3), (4) and (5))—i.e. $A_1, \ldots, A_n, t_1, \ldots, t_n, c_1, \ldots, c_m$ and $t_0$ or $f_0$ and $\phi$, and the signal offset $d_0$—are determined so that the deviation from the signal actually measured, interpreted as a noise vector, has a maximum probability density.

In the case of uncorrelated noise having a normal distribution, for example, this corresponds to a (non-linear) fit according to the least squares method. Thus, the determination of the parameters and of the transit times $t_k$—and hence of the target distances sought—is based, even in the general case of correlated noise, on a non-linear optimization problem, for the solution of which the prior art discloses many, generally iterative, methods—for example D. W. Marquardt: *An Algorithm for Least-Squares Estimation of Nonlinear Parameters*, SIAM Journal on Applied Mathematics 11 (1963), 431-441 or K. Levenberg: A. *Method for the Solution of Certain Non-Linear Problems in Least Squares*, Quarterly of Applied Mathematics 2 (1944), 154-168, or the classical BFGS method and further developments thereof or modern methods as described, for example, in the overview article by A. Forsgren, P. E. Gill, M. H. Wright: *Interior Methods for Nonlinear Optimization*, SIAM Review 44 (2002), 525-597.

Obtaining approximate starting values for the iterative optimization can also be effected on the basis of equation (6) using known methods if the deviation of the chirp signal from the linear case is relatively small which is to be regarded as a frequent case.

For improving the conditioning of the estimation problem, i.e. for increasing the numerical stability, the total phase change in the transmitted signal during a known time interval $t_a \leq t \leq t_b$—for example during the measuring interval, $t_a = -T/2$, $t_b = T/2$—is also measured according to $\phi_{tot} = \phi(t_b) - \phi(t_a)$. In the case of equation (7'), this leads to a linear secondary condition $$\sum_{j=1}^{m} [\Phi_j(t_b) - \Phi_j(t_a)] \cdot c_j = \Phi_{tot} \tag{8'}$$

for the coefficients $c_1, \ldots, c_m$, which can be taken into account in the optimization. In the general case (7), the nonlinear secondary condition $$\Phi(t_b; c_1, \ldots, c_m) - \Phi(t_a; c_1, \ldots, c_m) = \Phi_{tot} \tag{8}$$

is to be taken into account in the optimization.

The measurement of $\phi_{tot}$ can be realised, for example, in a simple manner by counting the number of times the transmitted signal passes through zero; the error of measurement is then not more than ½, which is negligible for most purposes compared with the large phase difference $\phi_{tot}$. For example, in the case of FIGS. 6 to 11 with $t_a = -T/2$, $t_b = T/2$: $\phi_{tot} \approx 10^5$. With additional complexity in terms of apparatus, the error can, if required, also be further reduced, for example by determining the residual phase by means of single-slope integration.

A further advantage of this approach is that no quadrature receiver is required, as described as a necessary component, for example, in EP 0 834 086 B1.

The knowledge of the actual profile of the signal generated by the signal generator or the frequency-modulated radiation emitted by the radiation source permits in principle two approaches. Firstly, the nonlinear part in the signal can be anticipated in the signal generation by appropriately actuating the signal generator. The signal generation is thus adapted—for example in real time—to the actual signal profile. Secondly, the knowledge of the actual error also permits compensation thereof in the signal processing and distance calculation. The two approaches can also be combined with one another, for example by readjusting the signal generator to a certain nonlinearity threshold, while the remaining deviation is accepted and taken into account in the computer.

The distance-measuring apparatus according to the invention or the distance-measuring method is described in more detail or explained below purely by way of example with reference to working examples shown schematically in the drawing. Specifically.

FIG. 1 to FIG. 5 show purely optical working examples in which the following reference numerals are used for identifying elements of the purely schematic diagrams of the apparatus components. Only the homodyne variant is shown. However, heterodyne variants and apparatuses in the non-optical spectral range, such as, for example, in the radar or microwave range, can also be realised according to the invention. The heterodyne variant requires a further signal generator or a further signal output which generates the second signal required for mixing.

| List of reference numerals | |
|---|---|
| ADC | Analogue/digital converter |
| BS | User interface |
| DE | Detector |
| DE1 | First detector |
| DE2 | Second detector |
| DSP | Digital signal processor |
| EO | Receiving optical system |
| MI | Mixer |
| MI1 | First mixer |
| MI2 | Second mixer |
| MS | Mixing signal |
| NL | Nonlinearity |
| SD | Beam splitter |
| SG | Signal generator |
| SO | Transmitting optical system |
| ST | Control |
| TF | Low-pass filter |
| TL | Driver and laser |
| UE | Superposition |
| ZA | Counter |
| 90° | 90° C. phase shifter |

Figure 1:
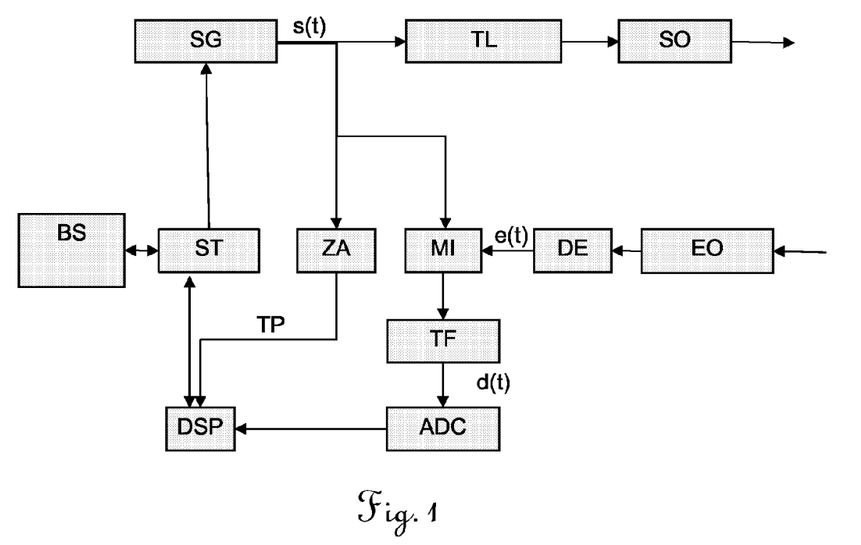
FIG. 1 shows the schematic diagram of a first working example according to the invention, with electrical signal as mixing signal and a counter for the total phase.

FIG. 1 shows the schematic diagram of a first working example according to the invention, comprising a mixer MI into which the electrical signal s(t) of the signal generator SG and the echo signal e(t) of the detector DE are coupled. The signal s(t) of the signal generator SG is also used for superposing a frequency modulation on the radiation generated by driver and laser TL. This optical radiation in the visible or non-visible spectral range is emitted via a transmitting optical system SO and, after reflection by one or more targets or objects, is received again via a receiving optical system EO and a detector DE. In the homodyne method, both the signal s(t) of the signal generator SG and the signal of the beam generation of driver and laser TL, included in the received radiation, are used by the mixer MI. The result of the mixer MI is digitized via a low-pass filter TF and an analogue/digital converter AC and fed to the digital signal processor DSP for signal processing. In parallel with the mixer MI, the total phase TP is determined by a counter ZA and likewise fed to the digital signal processor DSP. A control ST controls the signal generator SG so that a deviation of the signal generation from the ideal profile can be compensated. Either the signal s(t) generated by the signal generator SG can therefore be varied by the control ST so that the actual emission has a linear frequency profile or the error is taken into account purely algorithmically in the evaluation. In addition, corrections of the deviation from ideal behaviour and computational consideration thereof can also be combined. The distance-measuring apparatus can be controlled via a user interface BS.

Figure 2:
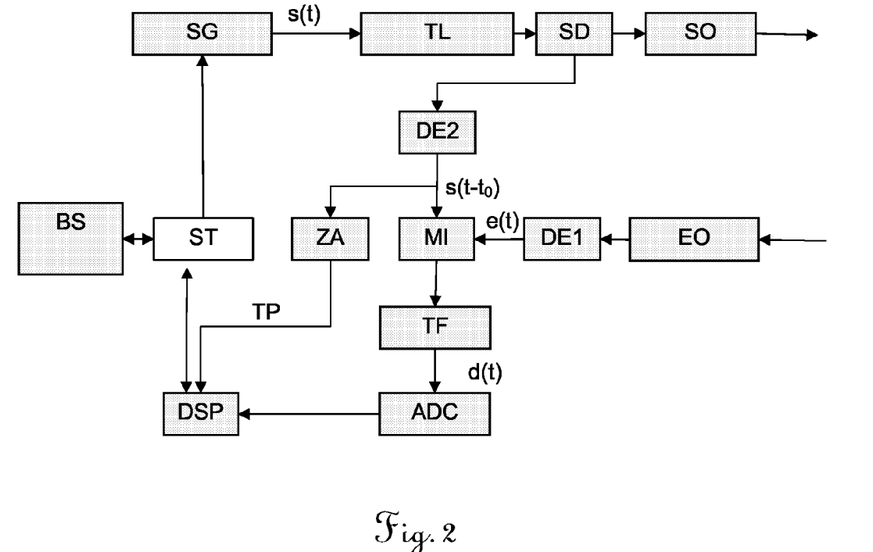
FIG. 2 shows the schematic diagram of a second working example according to the invention, with optically detected signal as mixing signal and a counter for the total phase.

FIG. 2 schematically shows a second working example according to the invention, comprising a mixer MI with optically detected signal and a counter ZA for the total phase TP. In contrast to FIG. 1, the signal s(t) of the signal generator SG is not fed directly to the mixer MI but the radiation emitted by the driver and laser TL is passed via a beam splitter SD to a second detector DE2, the output of which is once again connected both to the mixer MI and to a counter ZA for determining the total phase TP. This arrangement therefore uses not only the echo signal e(t) but also a second optically detected signal s(t–t$_0$) which is fed via an internal zone so that influences of the driver/laser combination TL act equally on both signals of the mixer MI.

Figure 3:
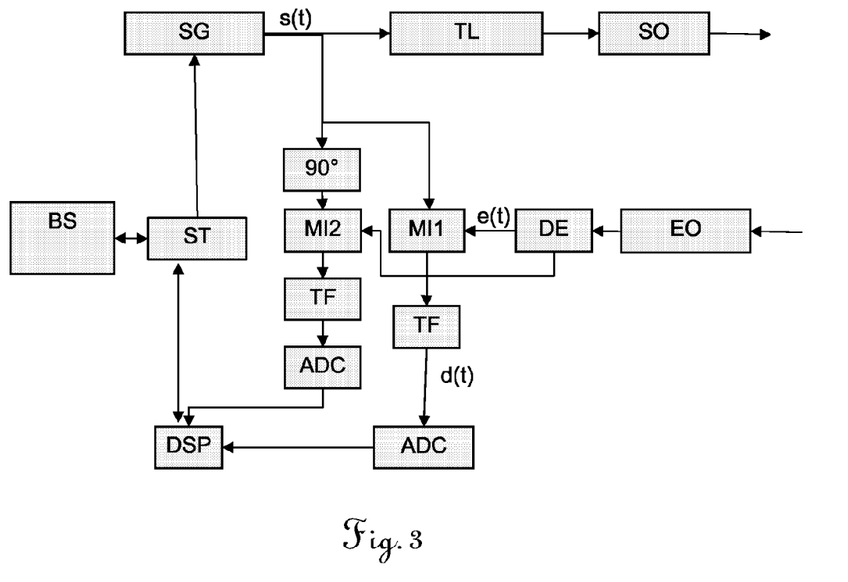
FIG. 3 shows the schematic diagram of a third working example according to the invention, with electrical signal as mixing signal and a quadrature receiver.

A working example similar to FIG. 1 is shown in FIG. 3 as a schematic diagram of a third working example according to the invention, comprising two mixers, direct electrical signal incoupling and a quadrature receiver. The signal i(t) of the signal generator SG is fed to a first mixer MI1 and a second mixer MI2 with down-circuit low-pass filters TF and analogue/digital converters ADC, the signal of the second mixer MI2 being shifted in an 90° phase shifter. The echo signal e(t) of the radiation registered by the detector DE is coupled both into the first mixer MI1 and into the second mixer MI2 so that a quadrature receiver results overall.

Figure 4:
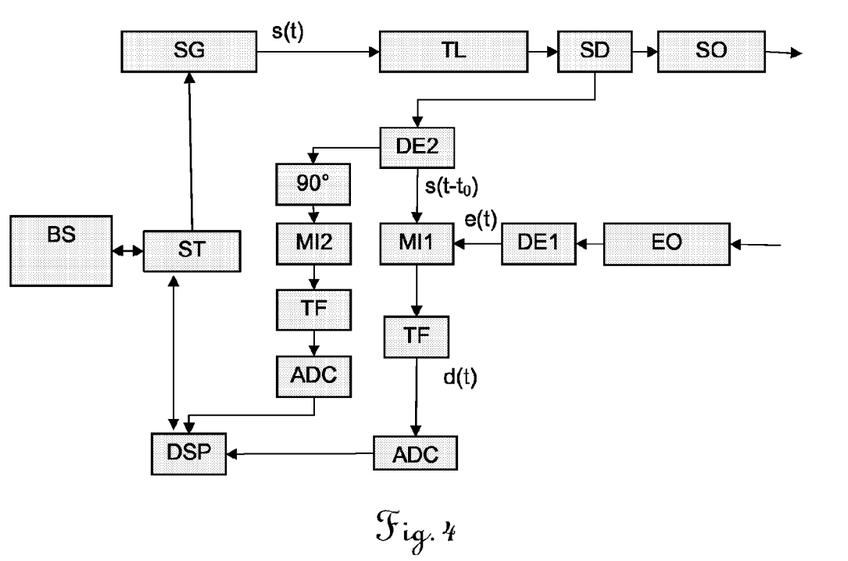
FIG. 4 shows the schematic diagram of a fourth working example according to the invention, with optically detected signal as mixing signal and a quadrature receiver.

FIG. 4 shows the schematic diagram of a fourth working example according to the invention which is similar to the second working example of FIG. 2 and comprises two mixers, optically detected signal s(t–t$_0$) and a quadrature receiver. This fourth working example combines the quadrature receiver of the third working example of FIG. 3 with the optical detection of the signal s(t–t$_0$) of the second working example of FIG. 2. In contrast to FIG. 1, the signal s(t) of the signal generator SG is not fed directly to the quadrature receiver, but the radiation emitted by driver and laser TL is passed via a beam splitter SD to a second detector DE2 which in turn is connected to the quadrature receiver.

Figure 5:
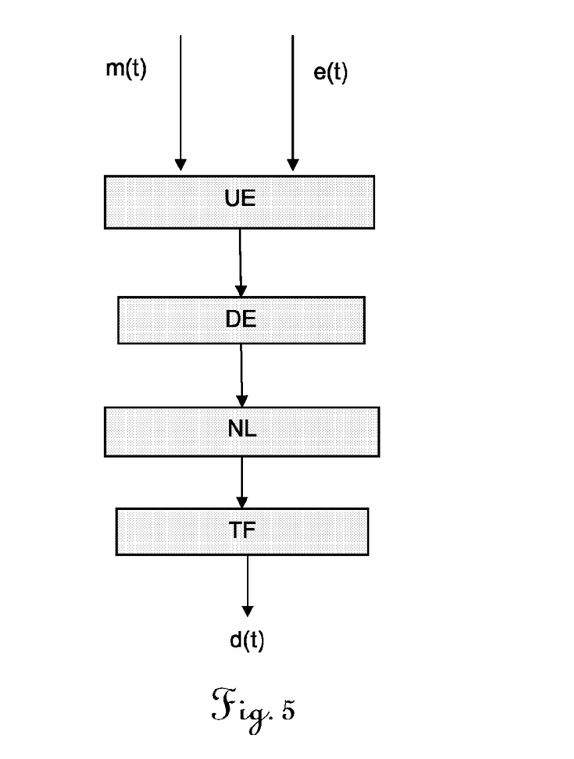
FIG. 5 shows the schematic diagram of the generation of a mixing term by the sequence of superposition and nonlinearity.

FIG. 5 schematically shows the generation of a mixed term by the sequence of superposition UE and nonlinearity NL. This generation of a mixed term represents a further fundamental possibility which can be combined with any of the above working examples. There are advantages particularly in association with the second working example, since a detector can be omitted thereby. The replacement of a mixer is effected by superposition UE of mixing signal m(t) and echo signal e(t) before or at the detector DE with subsequent nonlinearity NL and a low-pass filter TF. A quadratic nonlinearity NL produces as a mixed term precisely the desired product, and the low-pass filtration TF suppresses the undesired turns. This principle is used, for example, in diode or FET mixers.

The following FIG. 6-11 show the effects of a deviation from the strictly linear profile of the chirp for a homodyne and a heterodyne example, from which errors in the distance measurement can result. Without modelling the chirp profile, either more complicated apparatus must be employed in order to meet the linearity requirements or measurements containing errors must be accepted.

Figure 6:
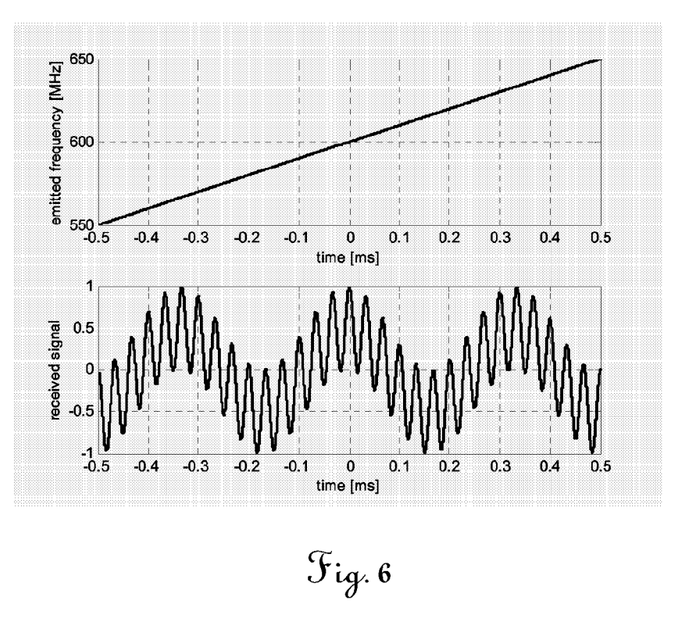
FIG. 6 shows the diagram of the frequency profile and of the received signal for a perfect linear chirp in the homodyne case.
Figure 7:
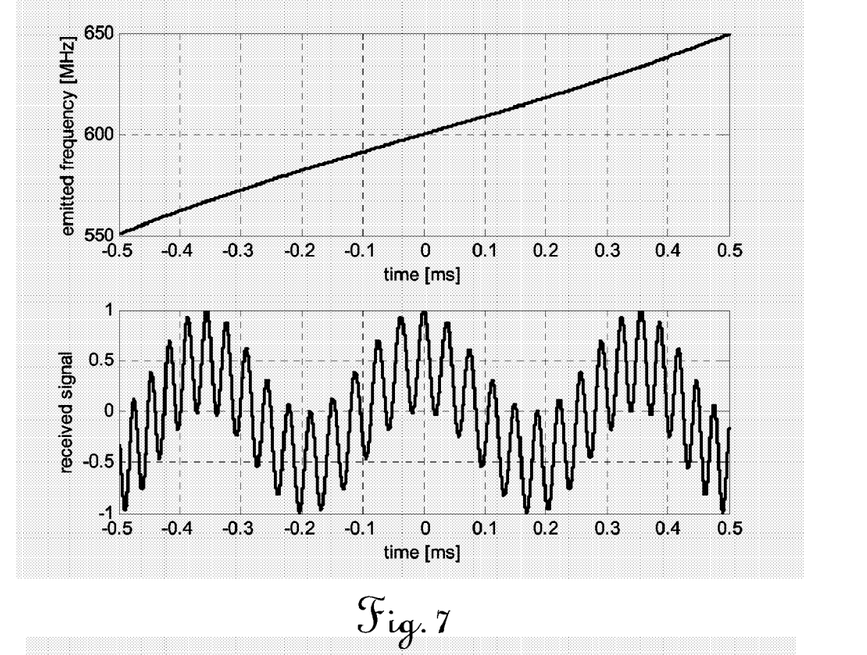
FIG. 7 shows the diagram of a disturbance of the ideal chirp with an additional fourth-order term in the homodyne case.
Figure 8:
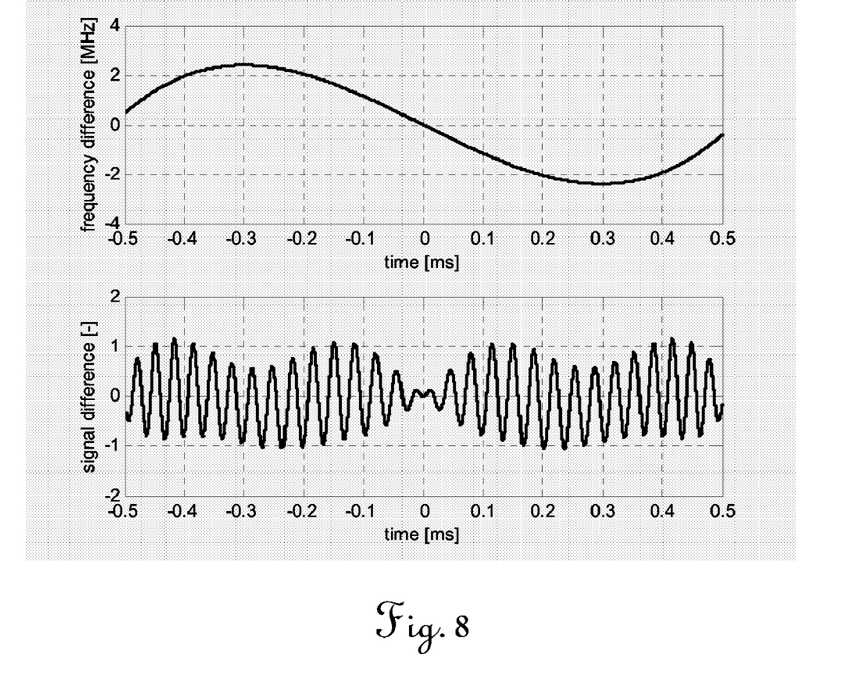
FIG. 8 shows the diagram of differences of emitted frequency and received signal between disturbed and ideal chirp in the homodyne case.

FIG. 6-8 show numerical examples for the homodyne case. The simulations were calculated by means of Matlab, the following values serving as basis:

| | |
|---|---|
| $f_s$ = 10 MHz | Sampling frequency |
| T = 1 ms | Chirp duration |
| m = 9980 | Number of sampling points |
| $f_0$ = 600 MHz | Centre frequency |
| B = 100 MHz | Chirp bandwidth |
| $d_0$ = 0 | Signal offset |

For two equally strong targets at the distances 4.5 m and 45 m, FIG. 6 shows the diagram of the frequency profile (top) and of the mixed and sampled received signal (bottom) for a perfect linear chirp in the homodyne case.

FIG. 7 shows a disturbance of the ideal chirp in the homodyne case with an additional fourth-order term in equation (1). In order that starting and end frequency do not change very much, a slight adaptation of the quadratic term was also carried out. The disturbance term in the phase function is therefore $$\Delta\Phi(t) = -6.0 \cdot 10^9 s^{-2} \cdot t^2 + 1.114 \cdot 10^{16} s^{-4} \cdot t^4 \quad (9)$$

FIG. 7 once again shows frequency profile (top) and mixed and sampled received signal (bottom).

FIG. 8 shows differences of emitted frequency and received signal between disturbed and ideal chirp in the homodyne case. Although the chirp frequency deviates only by a maximum of 0.42% from the ideal value, the difference in the received signal is just as large as the signal itself. The frequency difference (top) and the received signal difference (bottom) are shown.

Figure 9:
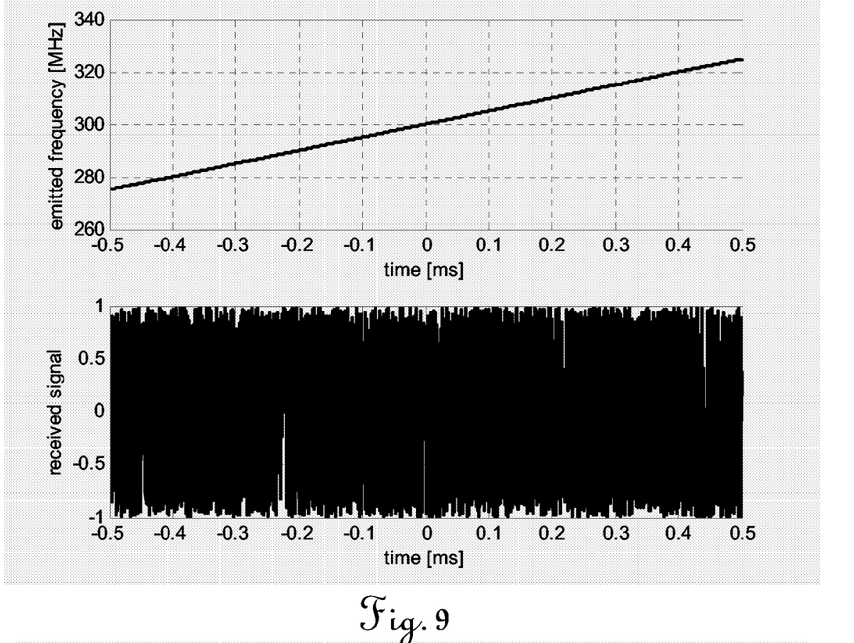
FIG. 9 shows the diagram of the frequency profile and of the received signal for the linear chirp in the heterodyne case.
Figure 10:
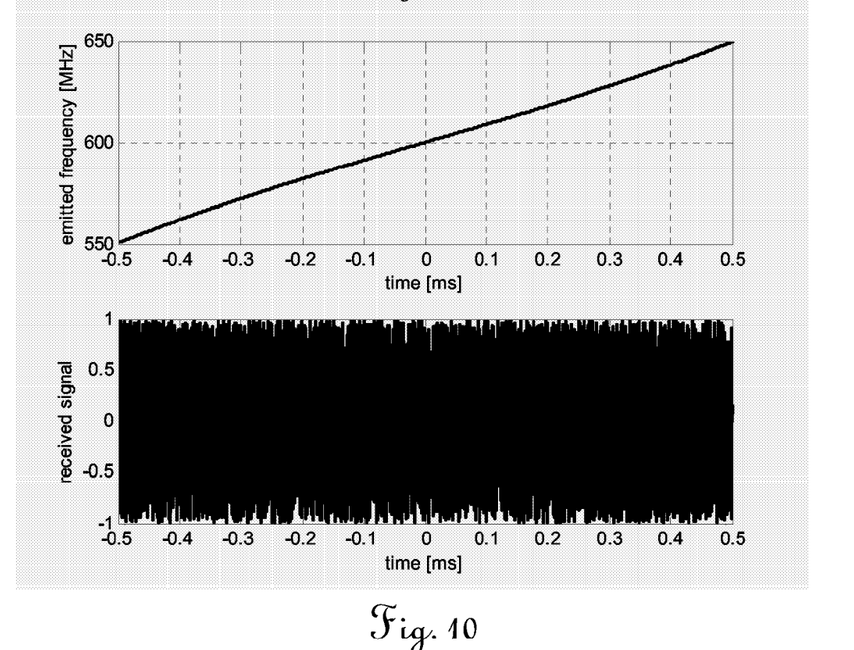
FIG. 10 shows the diagram of a disturbance of the ideal chirp with an additional fourth-order term in the heterodyne case and FIG. 11 shows the diagram of differences of omitted frequency and received signal between disturbed and ideal chirp in the heterodyne case.
Figure 11:
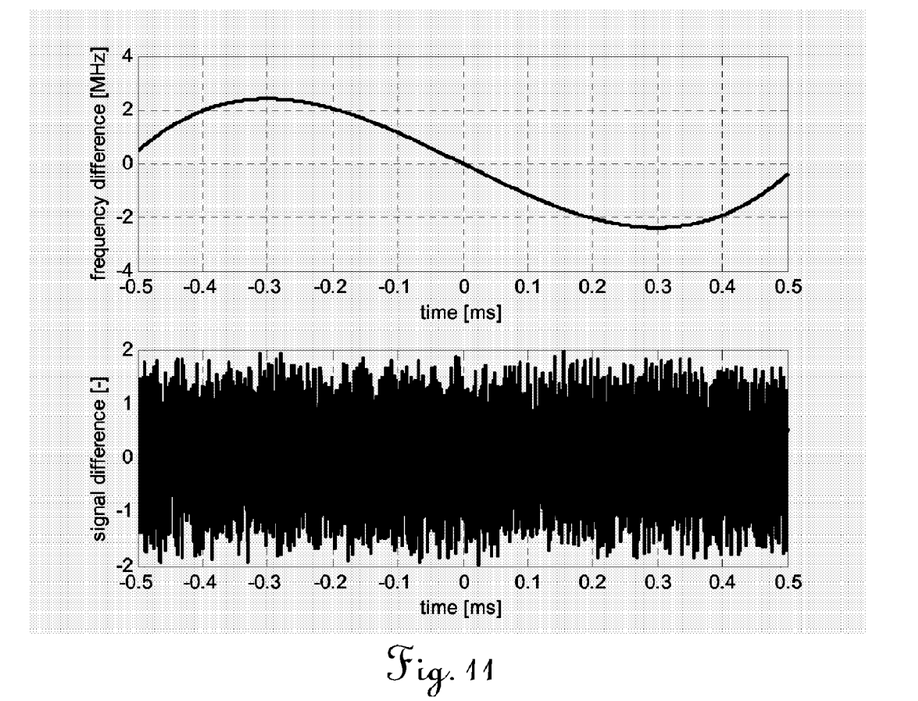

FIG. 9-11 show numerical examples for the heterodyne case. The simulations were likewise calculated by means of Matlab, the same values as in the homodyne case serving as a basis. The frequency $f_1$ of the harmonic mixing signal is $f_1$=500 MHz.

FIG. 9 shows the frequency profile (top) and the received signal (bottom) for the linear chirp in the heterodyne case. The same parameter values and the same target distances as in the above homodyne case are used.

FIG. 10 shows the effect of the disturbance according to equation (9) of the ideal chirp in the heterodyne case. Once again, frequency profile (top) and mixed and sampled received signal (bottom) are shown.

FIG. 11 shows the differences of emitted frequency and received signal between disturbed and ideal chirp in the heterodyne case. Although the chirp frequency deviates only by a maximum of 0.42% from the ideal value, the difference in the received signal is once again just as large as the signal itself.

It is of course self-evident to the person skilled in the art that the various arrangements of components or principles can be combined with one another in an alternative or supplementary manner. The working examples of the apparatuses can—as already mentioned—also be designed in heterodyne or homodyne construction, with mixers of different design, such as, for example, Gilbert cells or sampling mixers, or with replacement of one or more mixers by the sequence of superposition and nonlinearity.

The invention claimed is:

1. Electro-optical distance-measuring method comprising the following acts:
   transmitting frequency-modulated optical electromagnetic radiation to at least one target to be surveyed, a chirp in a model signal as a frequency superposed on the radiation being described by $$f(t) = \frac{d\Phi(t)}{dt}$$

with a phase function
   $\phi(t)=\phi(t;c_1, \ldots, c_m)$ modeled with parameters $C_j$;
   receiving radiation scattered back by the target;
   converting the received radiation into at least one received signal; and
   determining at least one distance to the at least one target from the received signal, wherein at least some of the parameters $c_j$ are determined directly from the received signal by solving a parameter estimation problem.

2. Distance-measuring method according to claim 1, wherein the received radiation is converted with homodyne or heterodyne mixing.

3. Distance-measuring method according to claim 1, wherein at least some of the parameters $c_j$ are determined by means of a maximum likelihood method, in particular together with the further system parameters and a transit time $t_k$ coordinated with at least one distance, so that the deviation of model signal from received signal has maximum probability density.

4. Distance-measuring method according to claim 1, wherein the cardinality of the set of parameters $c_j$ is finite.

5. Distance-measuring method according to claim 1, wherein the parameters $c_j$ are determined in each measurement.

6. Distance-measuring method according to claim 5, wherein the parameters $c_j$ are determined in each measurement together with further system parameters and/or a transit time $t_k$ coordinated with at least one distance.

7. Distance-measuring method according to claim 1, wherein a total phase change $\phi_{tot}=\phi(t_b)-\phi(t_a)$ in the transmitted signal during a known time interval is measured.

8. Distance-measuring method according to claim 7, wherein a total phase change $\phi_{tot}=\phi(t_b)-\phi(t_a)$ in the transmitted signal during the measuring interval is measured.

9. Distance-measuring method according to claim 1, wherein a total phase change $\phi_{tot}=\phi(t_b)-\phi(t_a)$ in the transmitted signal during a known time interval is measured by counting the passages of the transmitted signal through zero.

10. Distance-measuring method according to claim 1, wherein the phase function according to $$\Phi(t) = \sum_{j=1}^{m} c_j \Phi_j(t)$$

is modeled as a finite linear combination of suitable base functions $\phi_j(t)$.

11. Distance-measuring method according to claim 10, wherein:
a general secondary condition $\Phi(t_b; c_1, \ldots, c_m)-\Phi(t_a; c_1, \ldots, c_m)=\Phi_{tot}$ or a linear secondary condition $$\sum_{j=1}^{m} [\Phi_j(t_b) - \Phi_j(t_a)] \cdot c_j = \Phi_{tot}$$

is taken into account for the coefficients $c_1 \ldots, c_m$ in the signal evaluation.

12. Distance-measuring method according to claim 1, wherein the phase function according to $$\Phi(t) = \sum_{j=1}^{m} c_j \Phi_j(t)$$

is modeled as a finite linear combination of suitable base functions $\phi_j(t)$ with:
powers;
orthogonal polynomials;
wavelets; or
discrete delta functions at the sampling points as base functions.

13. Distance-measuring method according to claim 1, wherein the phase function $\phi(t)=\phi(t;c_1, \ldots, c_m)$ is modeled with nonlinear parameters $c_1, \ldots, c_m$ so that an optimization problem to be solved is also nonlinear with respect to the parameters $c_1, \ldots, c_m$.

14. Distance-measuring method according to claim 1, wherein approximate starting values for the transit times $t_k$ are calculated by means of frequency analysis and $$f_k(t) = \begin{cases} 2e(t_0 - t_k), & \text{homodyne} \\ d + 2e(t - t_k) - f_0, & \text{heterodyne} \end{cases}$$

is calculated with approximate values of the parameters, where e(t) designates an echo signal and d designates a signal offset.

15. Distance-measuring method according to claim 14, wherein the chirp slightly deviates from linearity.

16. Computer program product with program code, which is stored on a machine-readable medium or is embodied by an electromagnetic wave, for carrying out the method according to claim 1.

17. Computer program product according to 16, wherein the program code is configured to be executed by a computer.

18. Electro-optical distance-measuring apparatus, comprising;
a modulatable optical radiation source for production and for emission of optical radiation to a target to be surveyed;
a signal generator for modulation of the radiation source, a chirp as a frequency superposed on the radiation being described by $$f(t) = \frac{d\Phi(t)}{dt}$$

with a phase function $\phi(t)$;
a detector for receiving and for converting back-scattered radiation into received signals; and
a signal processor for processing the received signals, wherein the signal generator, detector, and signal processor are arranged and designed so that at least some of the parameters $c_j$ for modeling the phase function $\phi(t)$ are determined directly from the received signals by solving a parameter estimation problem.

19. Distance-measuring apparatus according to claim 18, wherein the signal processor includes a digital signal processor.

20. Distance-measuring apparatus according to claim 18, further comprising a mixer for carrying out a homodyne or heterodyne mixing procedure.

21. Distance-measuring apparatus according to claim 18, wherein the signal generator, detector and signal processor are arranged and designed so that the parameters $c_j$ are determined in each measurement.

22. Distance-measuring apparatus according to claim 18, wherein signal generator, detector and signal processor are arranged and designed so that the parameters $c_j$ are determined in each measurement together with further system parameters and/or a transit time $t_k$ coordinated with at least one distance.

23. Distance-measuring apparatus according to claim 18, further comprising an apparatus for determining the total phase of the transmitted signal.

24. Distance-measuring apparatus according to claim 23, wherein the apparatus for determining the total phase of the transmitted signal includes a counter.

25. Distance-measuring apparatus according to claim 18, further comprising a sequence of optical or electrical superposition of the back-scattered radiation with a mixing signal and a nonlinearity for producing a mixed term.

26. Distance-measuring apparatus according to claim 25, wherein the nonlinearity includes a quadratic nonlinearity.

27. Distance-measuring apparatus according to claim 18, further comprising a sequence of optical or electrical superposition of the back-scattered radiation with a mixing signal and a nonlinearity for producing a mixed term with a down-circuit low-pass filter.

28. Distance-measuring apparatus according to claim 18, further comprising a control which actuates the signal generator in such a way that deviations of the chirp from a linear frequency profile are compensated.

29. Distance-measuring apparatus according to claim 28, wherein deviations of the chirp from a linear frequency profile are compensated in real time.

30. Distance-measuring apparatus according to claim 18, wherein the distance-measuring apparatus is configured to perform the following:

transmit frequency-modulated optical electromagnetic radiation to at least one target to be surveyed, a chirp in a model signal as a frequency superposed on the radiation being described by $$f(t) = \frac{d\Phi(t)}{dt}$$

with a phase function
$\phi(t)=\phi(t;c_1, \ldots, c_m)$ modeled with parameters $C_j$;

receive radiation scattered back by the target;

convert the received radiation into at least one received signal; and determine at least one distance to the at least one target from the received signal, wherein at least some of the parameters $c_j$ are determined directly from the received signal by solving a parameter estimation problem.

* * * * *